United States Patent [19]

Sattin

[11] Patent Number: 5,965,094
[45] Date of Patent: Oct. 12, 1999

[54] POLYMERIZATION PROCESS WITH ANTI-SCALING AGENTS

[75] Inventor: Mario Sattin, Rovigo, Italy

[73] Assignee: C.I.R.S. S.p.A., Rovigo, Italy

[21] Appl. No.: 08/973,340

[22] PCT Filed: May 31, 1996

[86] PCT No.: PCT/IT96/00112

§ 371 Date: Mar. 12, 1998

§ 102(e) Date: Mar. 12, 1998

[87] PCT Pub. No.: WO96/39446

PCT Pub. Date: Dec. 12, 1996

[30] Foreign Application Priority Data

Jun. 5, 1995 [IT] Italy .................................. UD95A0109

[51] Int. Cl.⁶ .............................. B01J 19/02; B05D 3/02; B05D 3/10
[52] U.S. Cl. .................... 422/241; 252/176; 252/178; 427/318; 427/388.2; 428/463; 525/328.8; 525/330.4; 525/346; 526/62
[58] Field of Search ....................................... 252/176, 178; 510/247; 525/194, 328.8, 346, 330.4; 427/388.2, 318; 422/131, 241; 260/DIG. 31; 526/62; 428/463

[56] References Cited

U.S. PATENT DOCUMENTS

| | | | |
|---|---|---|---|
| 2,081,168 | 5/1937 | DeMering | 510/247 X |
| 3,669,946 | 6/1972 | Koyanagi et al. . | |
| 3,700,487 | 10/1972 | Crandon et al. | 427/388.2 X |
| 3,825,434 | 7/1974 | Berens et al. . | |
| 4,007,320 | 2/1977 | Peterson | 422/131 X |
| 4,068,059 | 1/1978 | Witenhafer | 526/62 |
| 4,976,997 | 12/1990 | Stockel et al. | 427/388.2 X |
| 5,037,483 | 8/1991 | Dubin | 510/247 X |
| 5,194,301 | 3/1993 | Boscan-Romero et al. | 427/318 X |
| 5,278,022 | 1/1994 | Wade et al. | 525/328.8 X |

FOREIGN PATENT DOCUMENTS

| | | |
|---|---|---|
| 0052421 | 5/1982 | European Pat. Off. . |
| 0598537 | 5/1994 | European Pat. Off. . |
| 5-230112 | 9/1993 | Japan . |

*Primary Examiner*—Richard D. Lovering
*Attorney, Agent, or Firm*—Finnegan, Henderson, Farabow, Garret & Dunner, L.L.P.

[57] ABSTRACT

According to the invention, there are provided a novel process for preparing an anti-scaling coating on the walls of a polymerization vessel by using aromatic compounds reacted with sodium hydroxymethanesulphinate, and an anti-scaling coating obtained by this novel process.

3 Claims, No Drawings

5,965,094

POLYMERIZATION PROCESS WITH ANTI-SCALING AGENTS

This application is an international application PCT/IT96/00112, with an international filing date of May 31, 1996, which entered the national stage in the U.S. under 35 U.S.C. § 371 as application Ser. No. 08/973,340.

TECHNICAL FIELD

The object of this invention is a polymerization process with anti-scaling agent for polymerizing of monomers in suspension or aqueous emulsion carried out in reactors (vessels) inside the walls of which an anti-scaling agent coating has been deposited capable of eliminating any scale formation or polymer film, and a process that leads to a composition of colourless and effective coating for the entire duration of the polymerization reaction.

Anti-scaling agents for polymerizing reactors and their application techniques are already well known in prior art.

BACKGROUND ART

At the present state of the art there are also different types of anti-scalers, (by anti-scaler or anti-scalers, anti-scaling agents is intended) for each type of polymer and for each of these there are different methods of application to form an anti-scaling coating on the inside of the reactors themselves.

For example the anti-scaler and its application technique for the polymerization of the vinyl chloride is not the same as that used in the reactor for the production of polystyrene or for the production of acrylic polymers, and so on.

This fact necessitates in the storing of various products, spraying and application devices with all the consequences of high management costs.

DISCLOSURE OF INVENTION

A first aim of this invention is to make an anti-scaler and a simple application technique that operates well in any type of polymerizing reactor and for the most varied types of different materials, therefore for polystyrene as well as for acrylic polymers, ABS, polyurethane and Polyvinylchloride, etc.

In the specific case of polymerization in aqueous suspension and of polymerization in aqueous emulsion of the vinyl chloride for example, it is known that in the reactors, a substantial deposit of scale forms having as main drawbacks:

a consistent maintenance for removing the scale with consequent interruption of the production, opening of the reactor and therefore high quantities of gaseous vinyl chloride monomer (VCM) emissions into the atmosphere;

pollution of the resultant product as some of the scaling parts go into the respective polymerized product with consequent worsening in quality and complaints by the users;

in conclusion there are obstacles both in the productive system and in ecological problems for the areas in which the industrial Polyvinylchloride plants (P.V.C.) operates.

This problem practically exists for all types of polymerizations.

Furthermore the anti-scaling products (agents) destined to coat the surfaces of the respective reactors are of a bluish colour or dark brown nearly black, wherefore the particles that detach from the crust, pollute the obtained polymer (for example obtained polyvinyl chloride) from the reactor under the form of black dots, that for example in the finished products worsens the qualitative aspect of the said product.

Furthermore it is to be noted that the material particles that detach from the crust of the reactor wall, end up in the product in reaction, constituting the pollution of the same, dealing generally with toxic products.

In prior art, the technique of condensation or polycondensation of naphthols and phenol with an aldehyde cross-linking product (e.g. formaldehyde and others), to obtain anti-scaling products is known.

For this purpose one refers to:

U.S. Pat. No. 3,669,946 (filed in the U.S. on Aug. 31st, 1970, disclosed on Jun. 13th, 1972), that suggests the use of formaldehyde and ketonic composites, naphthol etc. and also alpha-naphthylamine and nigrosin. This teaching predivulges the general concept of forming anti-scalers condensate parting from the formaldehyde with phenols and naphthols derivatives.

U.S. Pat. No. 3,825,434 (23rd Jul. 1974) describes an anti-scaling agent for the polymerizing of vinyl chloride, obtained from the condensation of the phenol with formaldehyde, where obviously for definition in this patent the obtained product is always classified as pertinent to the phenol-formaldehyde or polyarylphenol family.

U.S. Pat. No. 4,068,059 (filed on Feb. 17, 1977; published on the Jan. 10, 1978) explains furthermore the importance of using as anti-scalers, products that in their chemical structure contain one or more of the following groups: —OH; —COOH; SO3H and SO3Na. These groups are usually attached to an aromatic nucleus.

EP-A-0052421 describes a process for obtaining an anti-scaling product formed with formaldehyde that is made to react with 1-naphthol (alpha-naphthol), in which both the nuclear positions 2 and 4 are not replaced and the nuclear position 3 is not replaced or has a substitute that is not strongly electron-attractor to obtain a condensate.

Even in this case the product obtained according to the chemistry is to be considered always as pertinent to the polyarylphenol family.

JP-A-5-230 112 refers to a condensation product based on an aromatic amine and aromatic hydroxy compounds and are prepared with use of reaction terminators. In particular it is suggested to use a MeOH solution of 4-aminodiphenylamine and 2,7-dihydroxynaphthalene heated in the presence of p-benzoquinone (catalyst) for a certain period, combined with an aqueous solution of Rongalite, and stirred for a certain period to give a condensation product.

These latter products have the drawback to supply, a dark brown or dark blue nearly black product, and not always being suitable for usages in sectors of polymerizing with different materials.

In particular the last one is worse than the previous ones because Rongalite is used to terminate the reaction to give a condensation product. The condensation product being one of the causes giving said dark brown or dark blue nearly black product, because the condensate particles are of a visible size and produce in the supension a dark—bluish colour. Obviously this dark bluish colour gives to the resulting polymerized product a visible contamination.

With these anti-scaling agents the reaction to product polymers e.g. polyvinyl chloride, is difficult to control and leads to reticulate products insoluble in alkaline aqueous solution.

Furthermore, the coating of the reactor with these anti-scalers is consumed easily dispersing itself in the material in reaction, polluting it by colour and by toxicity.

Furthermore we must point out that these anti-scalers are of poor efficacy, or however require a massive deposit of scale on the wall, such to preclude some usages, as for example, sanitary and alimentary, where the requested limits of polluting products in the finished product are decidedly lower etc.

To obtain a good anti-scale efficacy, they must however deposit on the wall in high quantities which also affects costs.

The colour of the anti-scalers of the known technique is dark and little appreciated by the user also because it makes one think of a pollutant product.

The dark colour of the product leads to a crust on the wall, also of dark colour (blackish) and this does not allow to see eventual application defects. But much more serious is that already mentioned, that during the reaction crust particles detach and mix with the polymer. As these crust parts are black it is clear that there is a qualitative worsening of the product.

It is thought that these anti-scaling coatings, even if additives of partially hydrolysed polyvinyl acetates of other binders and sprayers with nitrogen or aqueous vapour on the inside of the polymerization reactors, form colloidal films not attached to the metallic structure of the walls with electronic ties. In conclusion these films, dried and placed in the interface between the mass in polymerization and the surface of the reactor itself when they are subjected to abrasion phenomena due to solid particles of polymers in aqueous suspension subjected to rotational agitation, in a short time detach from the reactor walls.

Aim of the present invention is to obviate the above-mentioned drawbacks and in particular to obviate the dark colour of the product and the poor adherence of the coating that it will form on the wall of the reactor.

The inventors originally thought of making an anti-scaling product that once applied onto the wall of the reactor is substantially colourless and strongly adherent to the metallic surfaces of the reactor itself.

It is known that for whitening an aromatic product, for example colorants, sodium hydrosulphite or potassium hydrosulphite is used.

Attempts to make the condensate of formaldehyde and 1-naphthol colorless with hydrosulphite have given negative results because the condensate result always remained bluish black tending to form deposits even if conducted in absence of oxygen, example presence of nitrogen.

In proceeding the research it was thought to avoid the reaction between formaldehyde and 1-naphthol in order to substitute it with a less toxic substance and able to form a colourless product.

After innumerable experimentations it was found that the best result can be obtained by combining the 1-naphthol with hydroxymethansulphinic acid (sodium hydroxymethanesulphinate) with the following formula:

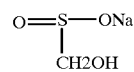

The product obtained was perfectly colourless.

Using the hydroxymethansulphinic acid mixed with the 1-naphthol in the weight proportions of 1 to 15, in an aqueous solution of 10 to 40%, and bringing the temperature of the solution between 70° and 95° C. in a nitrogen atmosphere, alkaline environment (pH 11–13), a clear transparent coloured product is obtained, fully reaching the prefixed aim and without decreasing the quality of the product, in fact improving it.

The product results physically of clear aspect, transparent, but if left in the presence of air for a certain period it oxidizes slightly verging towards a green blue colour.

If the contact with oxygen is interrupted, the product reverts to its original transparent clear aspect.

This physical behaviour proves that one has reached a completely new and structurally different product if compared to the products of prior art, where this physical phenomenon could not be observed.

It is thought that the reversibility of the phenomenon could be tied to the presence of a radical in the product, depending on the concentrations of oxygen it may or may not be tied to the molecular structure of the primary compound.

In conclusion according to the more probable deductions it should deal with an adducted bisulphite of the first product that forms in the reaction between 1-naphthol and hydroxymethansulphinic acid.

The product applied onto the surface of the reactor in an atmosphere deprived of oxygen, after drying, results an opalescent white opaque colour, contrarily to the dark colour of the present anti-scalers.

It is also known that to make the polyvinyl alcohols less soluble in water and able to form a very resistant film, cross-linking reactions between the hydroxyl groups of the polyvinyl alcohol and substances containing radicals able to inter-act with the hydroxyl groups themselves should be encouraged in the polymerization reaction.

Therefore we had the idea to apply this technique adding to the previously described colourless product, polyvinyl alcohol's having a degree of hydrolysis higher than 99% OH and the molecular weight between 70,000 and 90,000 and to apply this mixture to the internal walls of the reactor, maintained at about 85° C., by means of mixing and injection with aqueous vapour with a pressure of about 10 Kg./cm2.

The results were surprisingly good.

Advantageously it was discovered that the coating inside the reactors was colourless, very uniform and resistant to rubbing.

Spraying the product with water vapour at high temperature the maximum adherence result is obtained.

As the reaction of polymerizing in reactor lasts on average from four to six hours it is evident that in this time and in absence of oxygen, there are no substantial degradations of the product, and consequently calorimetric degradations, therefore once the reaction of polymerizing is completed and once the smallest anti-scaling percent is integrated in the polymerized mass, this will not undergo further important contaminations and degradations.

Instead, whilst in prior art using the anti-scaling products previously known, one had to fully wash and empty the reactor of every minimum trace of the residue of the product applied onto the wall as an anti-scaler, with this new product, it is possible to send the rinse of the reactor to the tank collection of the aqueous suspensions of the polymer obtained without requiring further refuse discharges, realizing in this way a complete and effective and above all economic technology of the loading and unloading of reactors of polymerization with the technique named by the experts of the sector as man hole closed.

As the hydroxymethanesulphincal acid may be also used with a molar hydrosulphite excess, even using this product a condensate of analogous or improved performance (largely reducing conditions) is obtained.

As both in this case and that of the preceding, the activity of the product is always given from the presence of bisulphate derivatives and in particular of radical bisulphites present in the derivative, this characteristic clearly distinguishes the new product from the prior art, and in particular with reference to the resulting structure of the derived product, this identifies as innovator for the presence of an interposed carbon atom between the aromatic rings and tied to a sulphonic group.

This bisulphitic product inhibited from sodium salt of hydroxymethansulphinic acid is perfectly able to cross-link polyvinyl alcohol present and therefore form strongly resistant reticulated combinations with the metals of the walls of the reactors(Iron, Nickel, Chrome). Hydroxymethansulphinic acid is also found in trade under the name rhongalite.

I claim:

1. A process for the preparation of an anti-scaling coating on the walls of a polymerization vessel using aromatic hydroxy compounds reacted with sodium hydroxymethanesulphinate, characterized in that said anti-scaling coating:

is obtained by first reacting sodium hydroxymethanesulphinate with 1-naphthol in a basic environment with the pH value 11–13 to prevent the evolution of the reaction into stable condensate forms;

the liquid mixture resulting is maintained in absence of oxygen and then adding to said liquid mixture, polyvinyl alcohol's having a degree of hydrolysis higher than 99% OH and the molecular weight between 70,000 and 90,000 and finally:

to apply this mixture to the internal walls of said polymerization vessel, maintained at about 85° C., by means of mixing and injection with aqueous vapour with a pressure of about 10 Kg./cm2.

2. A polymerization vessel having on its walls an anti-scaling coating applied by the process of claim 1, said anti-scaling coating containing bisulphitic radicals.

3. A polymerization vessel having on its walls an anti-scaling coating applied by the process of claim 1, said anti-scaling coating hydrosulphite.

* * * * *